(12) United States Patent
Traxler et al.

(10) Patent No.: US 11,072,553 B2
(45) Date of Patent: Jul. 27, 2021

(54) GLASS-MELTING COMPONENT

(71) Applicant: PLANSEE SE, Reutte (AT)

(72) Inventors: Hannes Traxler, Lechaschau (AT); Michael Mark, Arzl I.P. (AT); Robert Schiftner, Ehrwald (AT); Wolfram Knabl, Reutte (AT)

(73) Assignee: Plansee SE, Reutte (AT)

( * ) Notice: Subject to any disclaimer, the term of this patent is extended or adjusted under 35 U.S.C. 154(b) by 199 days.

(21) Appl. No.: 16/088,164

(22) PCT Filed: Mar. 23, 2017

(86) PCT No.: PCT/AT2017/000017
§ 371 (c)(1),
(2) Date: Sep. 25, 2018

(87) PCT Pub. No.: WO2017/161391
PCT Pub. Date: Sep. 28, 2017

(65) Prior Publication Data
US 2019/0177201 A1    Jun. 13, 2019

(30) Foreign Application Priority Data
Mar. 25, 2016 (AT) .................. GM 64/2016

(51) Int. Cl.
| | | |
|---|---|---|
| *C03B 5/425* | (2006.01) | |
| *B22F 3/24* | (2006.01) | |
| *C03B 5/167* | (2006.01) | |
| *C03B 5/43* | (2006.01) | |
| *B22F 5/00* | (2006.01) | |

(Continued)

(52) U.S. Cl.
CPC ............. *C03B 5/425* (2013.01); *B22F 3/168* (2013.01); *B22F 3/24* (2013.01); *B22F 5/007* (2013.01); *C03B 5/1672* (2013.01); *C03B 5/43* (2013.01); *C21D 1/26* (2013.01); *C21D 7/06* (2013.01); *C22C 27/00* (2013.01); *C22F 1/18* (2013.01); *B22F 2207/17* (2013.01); *B22F 2301/20* (2013.01); *B22F 2998/10* (2013.01); *B22F 2999/00* (2013.01); *C22C 1/045* (2013.01)

(58) Field of Classification Search
CPC ............................. C03B 5/2356; C03B 5/425
See application file for complete search history.

(56) References Cited

U.S. PATENT DOCUMENTS

| | | | |
|---|---|---|---|
| 3,685,978 A | 8/1972 | Hansen et al. | |
| 4,531,705 A * | 7/1985 | Nakagawa | ............. B22C 9/061 |
| | | | 249/134 |

(Continued)

FOREIGN PATENT DOCUMENTS

| | | |
|---|---|---|
| CN | 1222105 A | 7/1999 |
| CN | 1325775 A | 12/2001 |

(Continued)

*Primary Examiner* — Cynthia Szewczyk
(74) *Attorney, Agent, or Firm* — Laurence A. Greenberg; Werner H. Stemer; Ralph E. Locher

(57) ABSTRACT

A process for producing a glass melting component composed of refractory metal. A surface zone of the glass melting component is densified at least in sections by application of local compressive stress. As a result the surface zone has its porosity reduced compared to a volume section which is located underneath the surface zone and which has residual porosity.

9 Claims, 4 Drawing Sheets

(51) Int. Cl.
*C22C 27/00* (2006.01)
*B22F 3/16* (2006.01)
*C21D 7/06* (2006.01)
*C21D 1/26* (2006.01)
*C22F 1/18* (2006.01)
*C22C 1/04* (2006.01)

(56) References Cited

U.S. PATENT DOCUMENTS

| | | | | |
|---|---|---|---|---|
| 4,921,519 | A * | 5/1990 | Schinker | C03B 11/08 65/32.1 |
| 5,151,918 | A * | 9/1992 | Argent | C03B 5/43 373/27 |
| 6,143,241 | A | 11/2000 | Hajaligol et al. | |
| 6,171,546 | B1 | 1/2001 | Mars et al. | |
| 6,286,337 | B1 | 9/2001 | Palmquist | |
| 6,405,564 | B1 * | 6/2002 | Takei | C03B 5/1675 65/134.2 |
| 2003/0177793 | A1 | 9/2003 | Kock et al. | |
| 2005/0129951 | A1 * | 6/2005 | Collin | C22C 1/051 428/408 |
| 2006/0137402 | A1 | 6/2006 | Eichholz | |
| 2006/0141093 | A1 * | 6/2006 | Leu | C22C 29/067 425/161 |
| 2008/0202164 | A1 | 8/2008 | Hoysan | |
| 2009/0160108 | A1 * | 6/2009 | Niveau | F27D 1/0006 266/275 |
| 2015/0030494 | A1 | 1/2015 | Ward-Close | |
| 2015/0225870 | A1 | 8/2015 | Katoh et al. | |
| 2016/0096763 | A1 * | 4/2016 | Aimone | H05B 3/03 373/37 |

FOREIGN PATENT DOCUMENTS

| | | |
|---|---|---|
| CN | 1445185 A | 10/2003 |
| CN | 102992766 A | 3/2013 |
| DE | 2802734 A1 | 7/1979 |
| DE | 19921934 A1 | 11/2000 |
| JP | S62287028 A | 12/1987 |
| JP | H0754093 A | 2/1995 |
| JP | H09196570 A | 7/1997 |
| JP | H11152534 A | 6/1999 |
| JP | 2002536548 A | 10/2002 |
| JP | 2013512340 A | 4/2013 |
| JP | 2015516299 A | 6/2015 |
| RU | 2196118 C2 | 1/2003 |
| RU | 77268 U1 | 10/2008 |
| SU | 385933 A1 | 6/1973 |
| WO | 2011066126 A1 | 6/2011 |
| WO | 2015137340 A1 | 9/2015 |

\* cited by examiner 150 bar ⌀ 6 mm 250 bar ⌀ 6 mm

GLASS-MELTING COMPONENT

BACKGROUND OF THE INVENTION

Field of the Invention

The invention relates to a process for producing a glass melting component composed of refractory metal, and also a glass melting component composed of refractory metal.

Despite a high chemical resistance of refractory metals to glass melts, glass melting components composed of refractory metal nevertheless frequently suffer from corrosive attack by the glass melt.

To improve the resistance of surfaces which are in contact with melts, coatings are frequently applied. US 20150225870 A1 describes, for example, a molybdenum crucible for growing sapphire single crystals, with the interior wall of the crucible being provided with a coating composed of tungsten.

However, coatings have the disadvantage that elements or particles from the coating go into the melt and can contaminate the latter.

SUMMARY OF THE INVENTION

It is an object of the invention to provide a process for producing a glass melting component composed of refractory metal having improved resistance to glass melts. A glass melting component having improved resistance to melts should also be provided.

This object is achieved by a process for producing a glass melting component as claimed and a glass melting component as claimed. Preferred embodiments are indicated in the dependent claims.

The corrosive attack by glass melts on the glass melting component can be significantly reduced by a surface zone of the glass melting component being densified at least in sections by application of local compressive stress and having its porosity reduced compared to a volume section which is located underneath the surface zone and has residual porosity. The surface zone which has had its porosity reduced offers a lower opportunity for attack by a glass melt and is therefore more resistant against corrosive attack.

In the context of the present invention, refractory metals are the metals of group 4 (titanium, zirconium and hafnium), group 5 (vanadium, niobium, tantalum) and group 6 (chromium, molybdenum, tungsten) of the Periodic Table and also rhenium and alloys of the elements mentioned (refractory metal alloys). The term refractory metal alloys refers to alloys having at least 50 at. % of the element concerned.

These materials display, inter alia, excellent dimensional stability at high use temperatures and are chemically resistant to many melts. Molybdenum and molybdenum alloys have, for example, a very high resistance to many glass melts. For the purposes of the present patent application, glass melts are melts of oxidic materials such as siliceous glasses (for instance fused silica), borate glasses (for instance borosilicate glasses) and also melts of aluminum oxide.

For the purposes of the present patent application, glass melting components are components which are intended for use in contact with glass melts.

These include, for example, glass melting electrodes, tank linings in glass production or melting crucibles. Crucibles for producing fused silica or sapphire single crystals are worthy of particular emphasis.

Apart from the reduced porosity in the surface zone, the use of the process of the invention also leads to smoothing of the surface of the surface zone to which compressive stress has been applied. A surface which has been smoothed in this way offers reduced opportunity for corrosive attack by a glass melt. In addition, bubble formation in the glass melt is reduced.

The invention is particularly suitable for application to powder-metallurgically produced components which have residual porosity. For the purposes of the present invention, residual porosity is a proportion of pores present in the component, which during production remains in the volume of the material; this is particularly the case for powder-metallurgically produced components.

Powder-metallurgical production generally comprises pressing of a powder mixture and subsequent sintering.

Sintering can be followed by one or more forming steps. A shaped part can, for example, be manufactured from a semifinished part which has been formed in this way. An example is glass melting electrodes which are produced essentially by cutting forged and/or rolled rods to length.

Another example of the production of a glass melting component via a semifinished part is bending, extrusion or pressing of rolled metal sheet to give a crucible.

It is also possible to produce shaped parts directly by pressing of powder to a geometry of the future shaped part and subsequent sintering. Shaped parts produced in this way are referred to as p/s (pressed/sintered) shaped parts. p/s shaped parts are generally provided for use in their sintered state, optionally after mechanical machining to set desired tolerances. The term near net shape manufacturing is also employed in this context. A typical relative density of p/s shaped parts is from 92% to 97%, corresponding to a residual porosity of from 3 to 8%. A pressed/sintered component is generally largely free of plastic deformation.

A residual porosity of from 3 to 8% is acceptable for many applications, especially since the production route via pressing and sintering to give the net shape of a component is a very economical process. Crucibles, for example, can be produced advantageously in this way.

A surface zone of the glass melting component, which has residual porosity in other volume sections, is now densified by means of the process of the invention so that the porosity in the surface zone is reduced.

The application of local compressive stress is preferably effected by means of a rolling body in a smooth rolling process. The rolling body is pressed against a surface of a workpiece and conveyed in overlapping tracks across the surface. In smooth rolling, a surface zone of a workpiece is plastically deformed by means of the rolling body. The rolling body is generally small compared to the workpiece. No bulk deformation as in the case of rolling occurs. Deformation remains restricted to a zone close to the surface.

Smooth rolling is normally used for setting low roughnesses and for improving fatigue properties of workpieces by inducing residual compressive stresses on workpiece surfaces.

In the proposed application of smooth rolling to glass melting components which have residual porosity, preferably powder-metallurgically produced glass melting components, smooth rolling brings about a reduction in this residual porosity in a surface zone of the glass melting component which has residual porosity in other volume sections, as a result of which the glass melting component becomes less readily attacked by glass melts.

The application of local compressive stress can be effected by shot blasting. In the case of shot blasting, too, a reduction in the porosity in a surface zone was able to be observed, but only to a lower depth than in the case of smooth rolling.

The porosity of the densified surface zone is preferably reduced to less than 1% by the application of local compressive stress. The porosity of the densified surface zone is preferably in the range from 0% to 1%, in particular from 0.1% to 1%.

The local compressive stress applied is preferably above a yield point of the refractory metal. In this way, the refractory metal is plastically deformed in the surface zone.

After densification of the surface zone, the glass melting component is preferably subjected to a heat treatment at a temperature above a recrystallization temperature of the refractory metal. Quite contrary to teaching in connection with smooth rolling, where an increase in surface hardness and the introduction of residual compressive stresses is sought, this preferred process variant takes the apparently paradoxical route of subjecting the glass melting component which has previously been plastically deformed in a surface zone to a heat treatment at a temperature above the recrystallization temperature of the refractory metal. A heat treatment above the recrystallization temperature leads in all cases to any hardness increases present due to cold hardening and any residual compressive stresses present being degraded. For this reason, a heat treatment above the recrystallization temperature would generally not be carried out on components which have previously been treated for the purpose of increasing the hardness and/or introducing residual compressive stresses.

In experiments carried out by the applicant, it has, however, been discovered that the heat treatment above the recrystallization temperature leads to tremendous grain growth in the surface zone which has previously been densified by application of local compressive stress and thus plastically deformed. This can be explained by an increase in the driving force for grain growth, which is introduced by the plastic deformation of the surface zone. The preferred formation of a coarse-grained microstructure occurs at low degrees of deformation since only few recrystallization nuclei are available then.

The coarse-grained microstructure produced in the surface layer according to this preferred process variant significantly improves the resistance of the glass melting component to corrosive attack by a glass melt. Owing to the reduced number of grain boundaries, diffusion of the glass melt into the component is made more difficult.

Above the recrystallization temperature, the microstructure is transformed by elimination of lattice defects and formation of fresh grains. It is known that the recrystallization temperature is a function of the degree of deformation, with the recrystallization temperature usually decreasing with increasing degree of deformation. The reason for this is that energy is introduced into the material by deformation, and this energy acts as driving force for recrystallization.

A guideline for the recrystallization temperature $TR_{xx}$ is $0.3\,T_s < TR_{xx} < 0.5\,T_s$, where $T_s$ is the melting point of the material in kelvin.

The temperature of the heat treatment is preferably such that the recrystallization temperature of the densified surface zone is attained but no recrystallization takes place in the remaining volume which has not been deformed.

The heat treatment above the recrystallization temperature of the refractory metal particularly preferably occurs during a first use of the glass melting component. In this way, a separate ignition of the glass melting component can be dispensed with and the heat treatment bringing about grain growth occurs in situ. This can be realized for applications at use temperatures which are above the respective recrystallization temperature of the refractory metal concerned, or more precisely above the recrystallization temperature in the densified surface zone. For applications in the growing of sapphire single crystals and fused silica production, this is always the case. Here, typical use temperatures are 2000° C. and therefore reliably above the recrystallization temperature of the relevant materials.

It is also conceivable not to subject the entire glass melting component to the heat treatment but instead to heat only the surface zone. Thus, for example, only the surface zone can be heated by inductive heating.

Protection is also sought for a glass melting component composed of refractory metal which has, at least in sections, a surface zone which, compared to a volume section which is located underneath the surface zone and has residual porosity, has been densified and has reduced porosity.

The glass melting component has preferably been produced by a powder-metallurgical process, preferably pressing and sintering.

The porosity of the surface zone is preferably in the range from 0% to 1% and the residual porosity in the remaining volume is preferably in the range from 3% to 8%. The porosity of the surface zone is particularly preferably in the range from 0.1% to 1%.

Preference is given to the porosity of the surface zone being at least 1.5 percentage points below the porosity of an underlying volume section. In other words, the difference between the porosities is at least 1.5 percentage points. In a numerical example: when the porosity in an underlying volume section is 2.5%, then the porosity of the surface zone is 1% or less. This indicates that there is a significant difference in the porosity of the surface zone compared to an underlying volume.

The surface zone is preferably formed in every region of the glass melting component which is exposed to a glass melt during use of the glass melting component.

The pore-free surface zone preferably has a coarser grain structure than underlying volume sections of the glass melting component. Thus, an average grain size in the surface zone can preferably be at least 50% greater than in underlying volume sections, particularly preferably at least twice as great. The coarser grain structure in the surface zone brings about a higher resistance to corrosive attack by glass melts. This can be explained by the reduced number of grain boundaries in a coarse-grain microstructure compared to a fine-grain microstructure. A glass melting component configured in this way thus has a fine-grain microstructure in underlying volume sections. In the surface zone, on the other hand, the glass melting component has a coarse-grain microstructure which results in a particularly high resistance to corrosive attack by glass melts.

Preference is given to an average grain size of the surface zone being in the range from 40 to 1000 μm, preferably in the range from 100 to 300 μm, while there is, for example, an average grain size of 15-40 μm in underlying volume sections.

The surface zone preferably has a depth in the range from 50 μm to 1000 μm, preferably from 300 μm to 500 μm. In other words, the surface zone extends a distance of at least 50 μm and up to 1000 μm, preferably from 300 μm to 500 μm, into the volume of the glass melting component.

The surface of the surface zone preferably has a roughness Ra of less than 0.30 μm, preferably Ra less than 0.20

μm, particularly preferably less than 0.15 μm. In comparison, an untreated surface of a pressed/sintered component has a roughness Ra of typically 0.70 μm. A low roughness improves the resistance of the surface to corrosive attack. In addition, bubble formation at the surface is reduced since a smooth surface offers few nuclei for formation of gas bubbles.

In a preferred example, the glass melting component can be a crucible, in particular a crucible for producing fused silica or sapphire single crystals. The indicated nature of the glass melting component according to the invention is particularly advantageous for crucibles. The quality of fused silica or a sapphire single crystal produced therein is improved and the operating life of the crucible is prolonged.

In a further preferred example, the glass melting component can be a glass melting electrode. Here too, the advantages of the glass melting component according to the invention are particularly evident. Particular mention may be made of the reduced bubble formation and the prolonged operating life of glass melting electrodes configured in this way.

Preference may be given to the glass melting component having a densified surface zone both on an interior wall and on an outer wall. In this preferred embodiment, both an interior wall and also an outer wall of the glass melting component, in particular a crucible, is therefore densified by application of mechanical compressive stress in a surface zone. This variant is particularly useful for glass melting components forming a cavity, i.e., for example, crucibles or tanks. The glass melting component obtained in this way has a surface zone whose porosity is reduced compared to a volume section located underneath the surface zone both on its interior wall and on its outer wall.

The particular advantage of this variant is that a sandwich structure with both outer and interior densified surface zones is created thereby. After recrystallization, such a glass melting component displays a microstructure having coarse grains on both the interior and outer surface zones. In contrast, regions having smaller grains remain between these.

In the case of a surface zone which has been densified on only one side, grains which extend over the total wall thickness can be formed by recrystallization. Such through-wall grains and the grain boundaries thereof can be disadvantageous in respect of the impermeability of the glass melting component.

During recrystallization, grains grow toward one another from both sides in this embodiment, so that the formation of grain boundaries which extend over the entire wall thickness of the glass melting component can be avoided by an outer densified surface zone and an interior densified surface zone.

Preference is given to using the glass melting component for the accommodation or treatment of glass melts. For the purposes of the present invention, treatment is, for example, heating, stirring or shaping. Glass melts are for the present purposes melts of oxidic materials.

PRODUCTION EXAMPLE

A pressed/sintered round plate composed of molybdenum was densified in a surface zone on its upper side and on the underside by application of local compressive stress in a smooth rolling process. The tool in each case consisted of a ceramic rolling ball as rolling body, with two ball dimensions (diameter Ø6 mm and Ø13 mm) being used. The rolling ball can have a variable rolling pressure applied to it hydraulically.

As summarized in table 1, the pressed/sintered round plate was worked with one ball dimension on each side of the plate. 4 different pressures (50, 150, 250, 350 bar) were tested on each side of the plate. Experiments on concentric sections using different rolling pressures were carried out on each side of the plate.

TABLE 1

| Matrix of experiments | | |
| --- | --- | --- |
| Rolling pressure [bar] | p/s Mo round plate, side 1 Rolling ball Ø 6 mm | p/s Mo round plate, side 2 Rolling ball Ø 13 mm |
| 50 | x | x |
| 150 | x | x |
| 250 | x | x |
| 350 | x | x |

The rolling pressure acts as hydrostatic pressure on the rolling ball and is translated via the ball diameter and the ball impression on the surface into an effective compressive stress (active force per unit area of the ball impression). A person skilled in the art will know how to determine the areas of ball impressions needed to estimate the effective compressive stress from micrographs. Values for the effective compressive stress (pressure over the area) determined for the example of a Ø6 mm rolling ball are shown in the following table.

TABLE 2

| Rolling pressures and effective compressive stress for a Ø 6 mm rolling ball | |
| --- | --- |
| Rolling pressure [bar] | Effective compressive stress [MPa] |
| 50 | 738 |
| 150 | 892 |
| 250 | 1080 |
| 350 | 1059 |

Table 2 illustrates that an effective compressive stress of more than 1000 MPa can be applied using rolling pressures above about 250 bar at a ball diameter of 6 mm. A 0.2% offset yield stress regarded here as yield point for pressed/sintered molybdenum is not more than about 400 MPa. The compressive stress exerted is thus significantly above the yield point of the material.

The effective compressive stress is inversely proportional to the area of contact of the ball with the workpiece surface. The effective compressive stress increases only slightly more with increasing rolling pressure above about 250 bar.

The results of the roughness measurement on the round plates which have been worked are summarized in the following table.

TABLE 3

| Results of the roughness measurement | | |
| --- | --- | --- |
| Rolling pressure [bar] | Ø 6 mm rolling ball Ra [μm] | Ø 13 mm rolling ball Ra [μm] |
| 0 | 0.70 | 0.70 |
| 50 | 0.13 | 0.16 |
| 150 | 0.11 | 0.28 |
| 250 | 0.18 | 1.23 |
| 350 | 0.27 | 4.77 |

A MarsurfPS1 roughness measuring instrument from Mahr having a measurement distance of 5.6 mm was used. All values are individual measurements; the measurement error is typically in the region of 10%. The initial state before treatment is shown in the line for "0 bar" and is 0.70 μm.

The best smoothing of the surface was obtained for working with the Ø6 mm ball (lowest Ra of 0.11 μm), with a pressure in the range 100-200 bar having been found to be advantageous. When using the Ø13 mm ball, the lowest roughnesses were achieved at lower pressures than with the Ø6 mm ball, but were above the roughnesses which could be achieved using the Ø6 mm ball.

Above about 200 bar, the roughness was worse than in the initial state when using the Ø13 mm ball; 350 bar obviously lead to damage to the surface.

To examine the recrystallization behavior of the rolled surface, samples were taken from the pressed-sintered Mo round plate for each rolling pressure. The samples were heated in a hydrogen atmosphere to a maximum temperature in the range from 1700 to 2200° C. The hold time was 2 hours. The microstructural changes were analyzed on polished sections under an optical microscope.

Discussed here for disk-shaped samples (round plates), the process is applicable to any geometries of glass melting components.

The invention will be illustrated below with the aid of the figures.

DESCRIPTION OF THE INVENTION

Figure 1A:
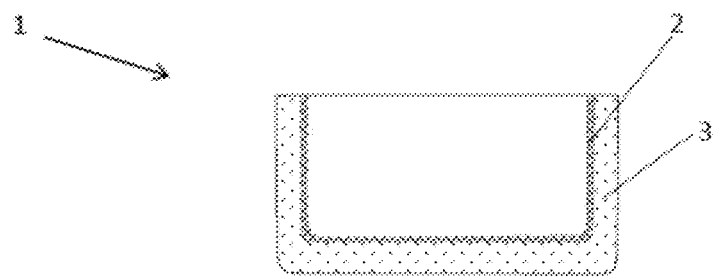
FIG. 1a-b working examples of glass melting components according to the invention, schematically in cross section FIG. 2a-b metallographic sections of samples which have been densified in a surface zone (unetched to determine the local porosity)
Figure 1B:
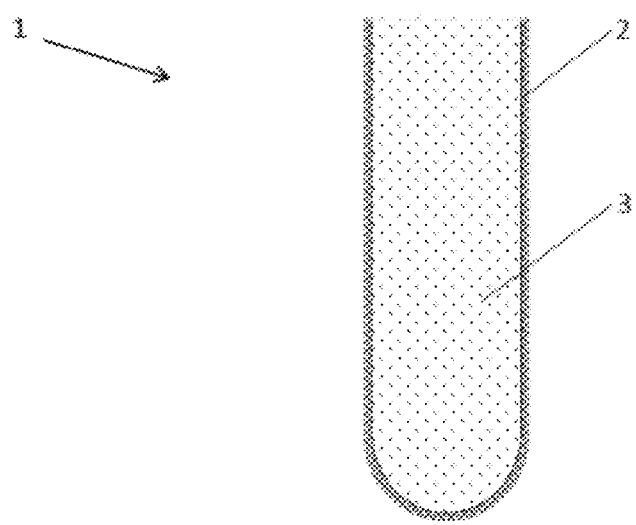

FIGS. 1a and 1b schematically show working examples of glass melting components 1 according to the invention in cross section. In FIG. 1a, the glass melting component 1 is configured as a crucible. The crucible can be provided, for example, for growing sapphire single crystals. In this case, the crucible is supplied with a charge of aluminum oxide which is melted in the crucible. The material of the crucible is typically tungsten or molybdenum. A surface zone 2 has been densified according to the invention on an interior wall of the crucible by application of a mechanical compressive stress, as a result of which the surface zone 2 has a lower porosity than underlying volume sections 3 of the glass melting component 1. The densification of the surface zone 2 is preferably carried out by smooth rolling. In smooth rolling, a rolling body is pressed against and conveyed over the surface. In the case of rotationally symmetric components, this can occur, for example, on a lathe.

The relative density of pressed/sintered crucibles (corresponding to the underlying volume sections 3) is, for example, 96%. This corresponds to a porosity of 4%.

The porosity of the surface zone 2 after densification is, for example, 0.02%. Due to the densified surface zone 2, the crucible is significantly more resistant to corrosive attack by the aluminum oxide melt than a conventional crucible. The virtually pore-free microstructure of the surface zone 2 offers less surface area to a melt for corrosive attack than does a microstructure having residual porosity.

The crucible which has been densified at the surface according to the invention is preferably subjected to a heat treatment above the recrystallization temperature of the densified surface zone 2. As a result of the method of production, underlying volume sections 3 of the pressed/sintered crucible do not have any plastic deformation, for which reason no or only minor recrystallization occurs in underlying volume sections 3. The recrystallization in the surface zone 2 results in strong grain growth in the surface zone 2. The temperature required for setting the desired coarse-grain microstructure can be determined by a person skilled in the art by means of experiments. Here, for example, heat treatments at various temperatures can be carried out. The temperature at which an advantageous coarse-grain microstructure is obtained can be determined by metallographic evaluation of the samples.

The resulting microstructure in the surface zone 2 has significantly coarser grains than the microstructure in underlying volume sections 3. The coarse-grain microstructure of the surface zone 2 brings about a further-increased resistance of the glass melting component 1 to corrosive attack by a melt. Since grain boundaries always represent weak points for corrosive attack, a coarse-grain microstructure is more corrosion-resistant than a microstructure having fine grains.

The heat treatment preferably takes place in situ during use of the crucible. The typical use temperatures for crucibles for growing sapphire single crystals are ≥2000° C. Thus, the desired coarse-grain microstructure is formed in the first use of the crucible without a separate heat treatment having to be carried out.

In FIG. 1b, the glass melting component 1 is configured as glass melting electrode. Glass melting electrodes serve to heat glass melts by direct passage of electric current through the glass melt.

Glass melt electrodes are typically made of forged and/or rolled molybdenum rods. Owing to the low degrees of deformation of rod material, glass melting electrodes have, for example, a residual porosity of 3%, corresponding to a relative density of 97%.

The glass melting electrode according to the present working example has a densified surface zone 2 having a porosity of, for example, 0.02%, while the porosity is 3% in underlying volume sections 3 of the glass melting electrode.

As indicated for the working example of the crucible, a heat treatment to recrystallize the surface zone 2 is preferably also carried out here.

The glass melting electrode according to the working example is significantly more resistant to corrosive attack by glass melts than a conventional glass melting electrode.

Figure 2A:
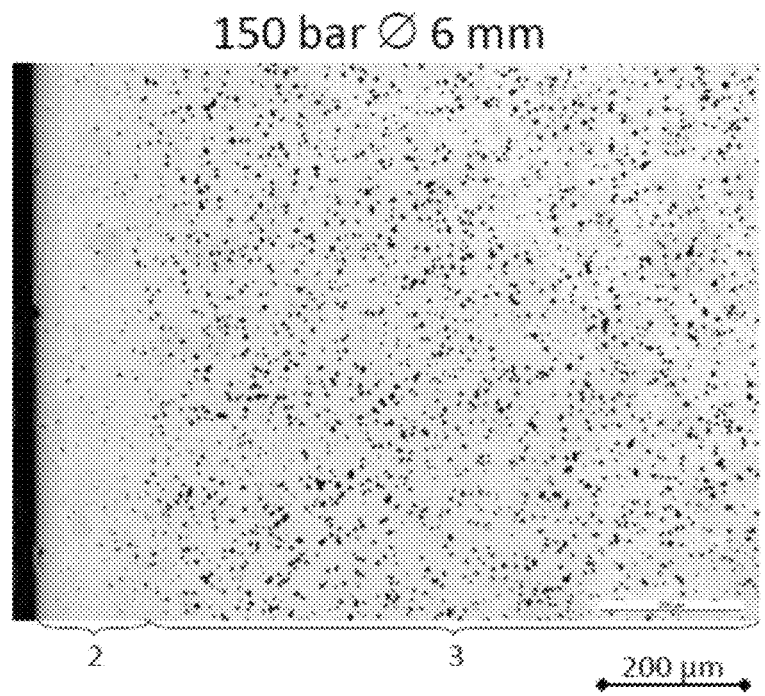
Figure 2B:
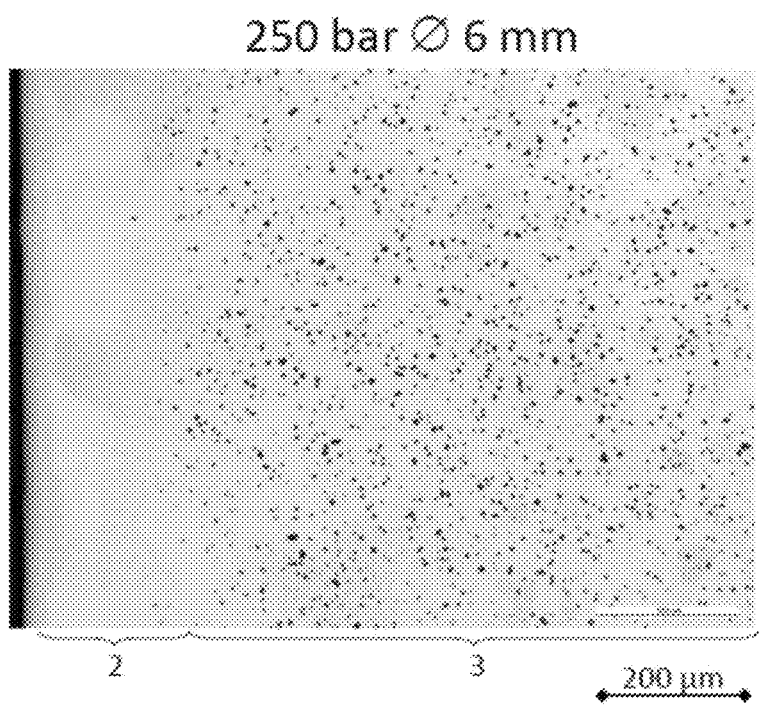

FIGS. 2a-b show optical micrographs of unetched metallographic polished sections through the surface zone 2 and underlying volume sections 3 of pressed/sintered molybdenum round plates in which a surface zone 2 has been densified by smooth rolling with a Ø6 mm ball at a rolling pressure of 150 bar or 250 bar.

The surface zone 2 is in each case located at the left-hand margin of the picture. It can be seen even from the pictures that the porosity in the surface zone 2 has been significantly reduced compared to the underlying volume sections 3. The following table shows the results of the porosity determination on the samples of FIGS. 2a-b.

TABLE 4

Results of the porosity determination on the samples of FIGS. 2a-b

| Rolling pressure | FIG. | Position | Porosity [%] |
|---|---|---|---|
| 150 bar | FIG. 2a | Surface zone | 0.4 |
|  |  | 500 µm from the surface | 4.6 |
| 250 bar | FIG. 2b | Surface zone | 0.2 |
|  |  | 500 µm from the surface | 5.1 |

The quantitative evaluation gave a porosity of the surface zone 2 of about 0.4% for a rolling pressure of 150 bar and of about 0.2% for a rolling pressure of 250 bar. The porosity in underlying volume sections 3, on the other hand, is about 4-5%.

In summary, it can be seen from FIGS. 2a-b and the quantitative microstructural analysis that application of compressive stress, in this example by means of smooth rolling, to the surface zone 2 of a pressed/sintered sample leads to virtually complete elimination of pores. The depth of the densified surface zone 2 is about 200 µm in the case of the samples subjected to a rolling pressure of 150 bar, and is about 300 µm in the case of the samples subjected to a rolling pressure of 250 bar.

The determination of the porosity was carried out by means of quantitative microstructural analysis via proportion by area of pores. For this purpose, a black-and-white picture is produced from the optical micrograph and the proportion by area of the pores is determined on representative sections of the picture using an image analysis program.

FIGS. 3a-d show optical micrographs of polished sections through the densified surface zone 2 and parts of underlying volume sections 3 of samples of pressed/sintered molybdenum which have been densified in the surface zone 2. The polished sections were etched in order to make the grain boundaries visible.

The parameters in the densification of the surface zone 2 were 150 bar (FIGS. 3a and 3b) or 250 bar (FIGS. 3c and 3d) rolling pressure using a Ø6 mm rolling ball as rolling body.

Figure 3A:
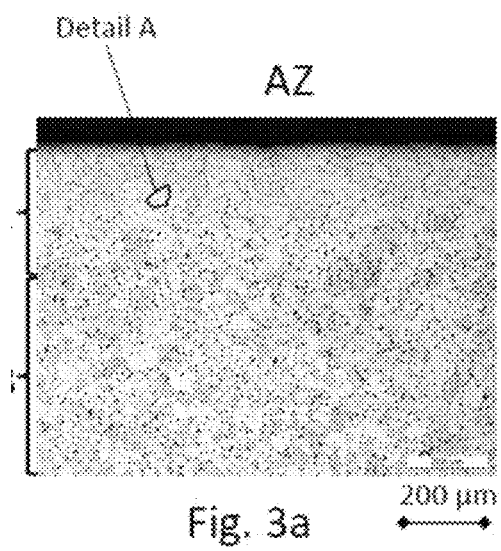
FIG. 3a-d metallographic sections of samples which have been densified in a surface zone and heat treated (etched to determine the grain size)
Figure 3B:
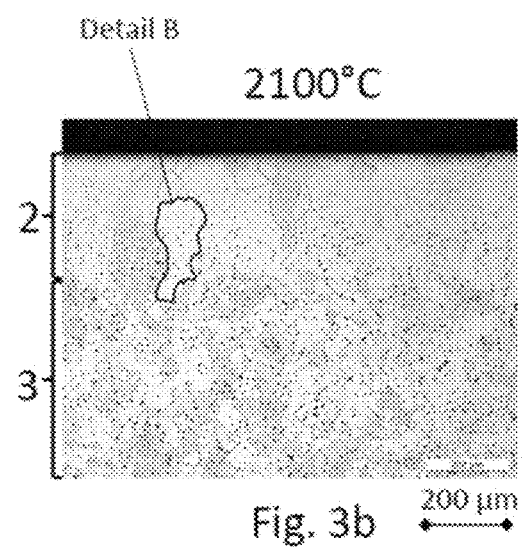
Figure 3C:
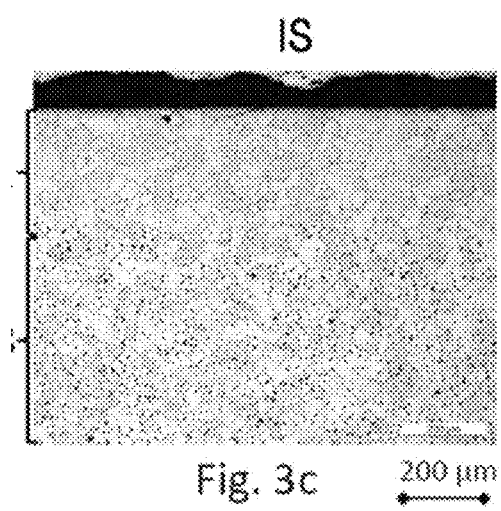

FIGS. 3a and 3c show the initial state ("IS") after densification of the surface zone 2 by application of mechanical compressive stress before a heat treatment. In the initial state before a heat treatment, a fine-grain sintered microstructure is present both in the surface zone 2 and in underlying volume sections 3.

Figure 3D:
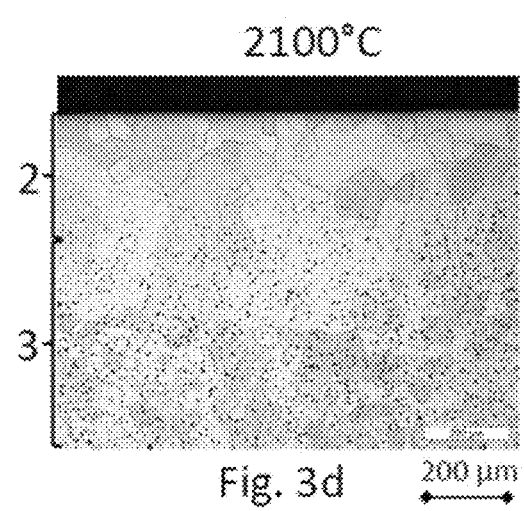

FIGS. 3b and 3d show the microstructure after recrystallization by means of a heat treatment at 2100° C. and a hold time of two hours. The coarsening of the grain structure in the surface zone 2 can clearly be seen. In undeformed underlying volume sections 3, a fine-grain microstructure remains.

For better discernibility, individual grains are outlined. Detail A in FIG. 3a shows, by way of example, a grain in the surface zone 2 in the initial state. The grain size is about 40 µm. Detail B in FIG. 3b shows a grain in the surface zone 2 of a sample which has been heat treated at 2100° C. The grain size is about 250 µm. The grain sizes in undeformed underlying volume sections 3 remain unchanged. It can be seen therefrom that the recrystallization bringing about grain growth takes place only in the surface zone 2 into which driving force for the recrystallization in the form of mechanical work of deformation has been introduced by the mechanical densification.

The results of a quantitative microstructural analysis in respect of the grain sizes are summarized in the following table.

TABLE 5

Results of the quantitative microstructural analysis of the samples of FIG. 3

| Rolling pressure | State | Position | GS [µm] | GS ASTM | NG [1/mm²] |
|---|---|---|---|---|---|
| 150 bar | IS (FIG. 3a) | Surface zone | 33 | 6.5 | 900 |
|  |  | 500 µm from the surface | 30 | 6.8 | 1056 |
|  | 2100° C./2 h (FIG. 3b) | Surface zone | 64 | 4.6 | 240 |
|  |  | 500 µm from the surface | 38 | 6.1 | 676 |
| 250 bar | IS (FIG. 3c) | Surface zone | 35 | 6.3 | 784 |
|  |  | 500 µm from the surface | 35 | 6.4 | 812 |
|  | 2100° C./2 h (FIG. 3d) | Surface zone | 64 | 4.6 | 240 |
|  |  | 500 µm from the surface | 41 | 5.9 | 576 |

Table 5 shows the results of the quantitative microstructural analysis of the samples depicted in FIGS. 3a-d. The abbreviations have the following meanings: IS—initial state after smooth rolling, GS—average grain size, NG—number of grains. The average grain size in µm, the grain size determined by the ASTM method ("ASTM number") and the number of grains were determined in accordance with ASTM E112-13. The evaluation was carried out by the line intercept method on optical micrographs of etched polished sections. The measurement accuracy in the determination of the grain size in µm is about 5%.

It can be seen that the grain size in the surface zone 2 after the heat treatment is almost doubled compared to the undeformed microstructure in underlying volume sections 3.

The heat treatment above the recrystallization temperature of the deformed surface zone 2 thus leads to significant grain growth. Since the number of grain boundaries in a coarse-grain microstructure is reduced, and diffusion of impurities in the high-temperature range takes place predominantly along the grain boundaries, a coarse-grained surface zone 2 results in reduced grain boundary diffusion. Corrosive attack by diffusion of melt along grain boundaries is made more difficult. In addition, the coarse-grain microstructure of the surface zone 2 improves the creep resistance of a glass melting component 1 produced in this way.

Finally, the resulting very smooth surface of the surface zone 2 reduces possible bubble formation caused by oxides in a melt. A smooth surface offers fewer nuclei for the formation of gas bubbles.

This leads to significantly improved properties of glass melting components 1 produced in this way.

The densification of the surface zone 2 by application of local compressive stress is inexpensive and can in principle be employed for all refractory metal materials.

Figure 4A:
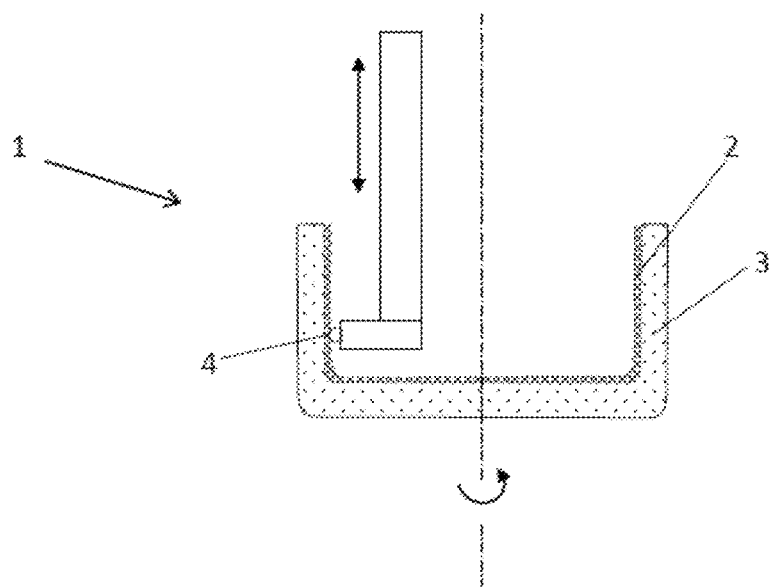
FIG. 4a-b a schematic depiction of the process

FIG. 4a shows a schematic depiction of the process of the invention. In the example shown, the glass melting component 1 is a crucible. A surface zone 2 of the glass melting component 1 having residual porosity in underlying volume sections 3 is densified by application of local compressive stress by means of a rolling body 4 and the surface zone 2 becomes virtually pore-free. The process is effected here by pressing-on of a spherical rolling body 4.

Figure 4B:
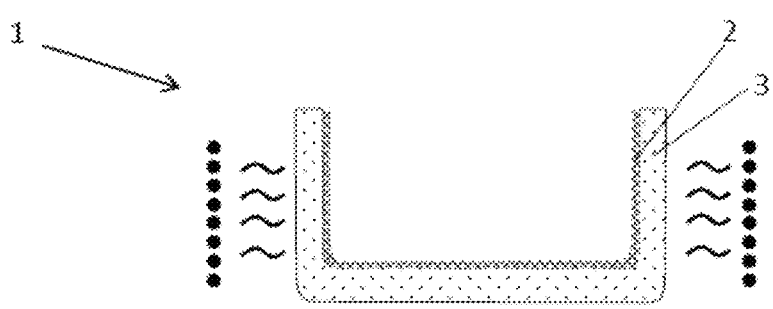

The glass melting component 1 is then preferably subjected to a heat treatment above the recrystallization temperature of the refractory metal forming the glass melting component 1, as shown schematically in FIG. 4b. This heat treatment leads to coarse grain formation in the previously deformed surface zone 2.

The apparently paradoxical route of subjecting the glass melting component 1 which has previously been plastically deformed in a surface zone 2 to a heat treatment at a temperature above the recrystallization temperature of the refractory metal is thus chosen. A heat treatment above the recrystallization temperature leads in all cases to any increases in hardness due to cold hardening and also any residual compressive stresses present being degraded. In the prior art, however, it is precisely this, namely an increase in hardness and induction of residual compressive stresses, which is intended as a result of application of local compressive stress. For this reason, a heat treatment above the recrystallization temperature is not carried out in the prior art on components which have previously been treated for the purpose of increasing the hardness and/or introducing residual compressive stresses.

However, as indicated above, the coarse-grain microstructure resulting from this heat treatment leads to improved resistance of the glass melting component 1 to corrosive attack by glass melts.

The invention claimed is:

1. A glass melting component composed of refractory metal, the component comprising:
   a surface zone and a volume section underneath said surface zone;
   said surface zone being, at least in sections, densified and having a reduced porosity relative to a residual porosity of said volume section underneath said surface zone;
   said surface zone and said volume section being composed of the refractory metal; and
   said surface zone having a coarser grain structure than said volume section of the glass melting component;
   wherein an average grain size in said surface zone lies in a range from 40 µm to 1000 µm.

2. The glass melting component according to claim 1, being a glass melting component produced by a powder-metallurgical process.

3. The glass melting component according to claim 1, wherein the porosity of said surface zone is not more than 1%.

4. The glass melting component according to claim 1, wherein the porosity of said surface zone is at least 1.5 percentage points lower than the porosity of said underlying volume section.

5. The glass melting component according to claim 1, wherein said surface zone has a depth in the range from 50 µm to 1000 µm.

6. The glass melting component according to claim 1, wherein a surface of said surface zone has a roughness Ra of less than 0.30 µm.

7. The glass melting component according to claim 1, wherein the glass melting component is a crucible.

8. The glass melting component according to claim 1, wherein the glass melting component is a glass melting electrode.

9. The glass melting component according to claim 1, comprising an interior wall and an outer wall each having a respective said densified surface zone.

* * * * *